United States Patent [19]

Grein et al.

[11] Patent Number: 4,640,455
[45] Date of Patent: Feb. 3, 1987

[54] METHOD OF MAKING A METAL SEAL FOR FLANGED JOINTS AND A SEAL MADE BY SAID METHOD

[75] Inventors: Lutz Grein; Günter Matthiensen, both of Hanau, Fed. Rep. of Germany

[73] Assignee: Leybold-Heraeus GmbH, Cologne, Fed. Rep. of Germany

[21] Appl. No.: 846,835

[22] Filed: Apr. 1, 1986

Related U.S. Application Data

[63] Continuation of Ser. No. 511,309, Jul. 6, 1983, abandoned.

[30] Foreign Application Priority Data

Jul. 7, 1982 [DE] Fed. Rep. of Germany ....... 3225361

[51] Int. Cl.$^4$ ............................................. B23K 31/08
[52] U.S. Cl. .................................. 228/176; 29/469.5; 228/173.5; 277/236
[58] Field of Search ................. 277/236; 228/142, 176; 29/469.5

[56] References Cited

U.S. PATENT DOCUMENTS

| | | | |
|---|---|---|---|
| 1,826,966 | 10/1931 | Summers | 277/236 |
| 2,723,330 | 11/1955 | Holroyd et al. | 219/57 |
| 2,831,244 | 4/1958 | Adell | 228/142 |
| 4,381,869 | 5/1983 | Abbes et al. | 277/236 |

FOREIGN PATENT DOCUMENTS

| | | |
|---|---|---|
| 392437 | 3/1924 | Fed. Rep. of Germany . |
| 1762330 | 11/1957 | Fed. Rep. of Germany . |
| 2817665 | 10/1979 | Fed. Rep. of Germany . |
| 596311 | 8/1925 | France . |
| 2074714 | 8/1971 | France . |
| 86728 | 1/1974 | German Democratic Rep. . |

*Primary Examiner*—Kenneth J. Ramsey
*Attorney, Agent, or Firm*—Felfe & Lynch

[57] ABSTRACT

A readily mountable metal seal member is made from a profiled metal bar having a cross section approximately in the shape of a keyhole, the thicker portion of which forms the sealing bead of the seal member and the thinner portion serves to mount it in the joint to be sealed. Sections of the thinner portion may be removed over regions to be curved.

3 Claims, 5 Drawing Figures

METHOD OF MAKING A METAL SEAL FOR FLANGED JOINTS AND A SEAL MADE BY SAID METHOD

This is a continuation of application Ser. No. 511,309 filed July 6, 1983 and abandoned herewith.

BACKGROUND OF THE INVENTION

The present invention relates to a method for making a metal seal for flanged joints, particularly for high-vacuum applications. The invention further relates to a metal seal made by said method.

It is known from German design patent No. 17 62 330 to fabricate metal seal rings for flanged joints from sheet aluminum. This is done by punching circular rings from the aluminum sheet and then upsetting the inner rim of the ring for formation of a sealing bead. A drawback of this prior-art method is that in the case of large seal cross sections, and particularly of those which deviate from circularity, the attendant technical complexity renders it uneconomical.

To overcome this drawback, it has already been proposed to provide flanged joints for use in radioactive, toxic or explosive environments, and also for high-vacuum applications, with seals made of aluminum wire. Wire of superpure aluminum of a diameter ranging from 1 to 3 mm is preferably used. Such wire is supplied on reels. To make a seal, the desired length of wire is unreeled, given the shape of the desired seal, and welded together.

The mounting of such seals is complicated especially when the flange faces to be sealed are disposed vertically. In the past, these seals were secured in place in the mounting position with adhesive tape. Then a silicone adhesive was applied in a few spots, and when it had set the adhesive tape could be removed. This mounting technique has the further drawback that wetting of the seal with silicone adhesive on the medium side or on the sealing-face side cannot be avoided even when the utmost care is taken. Since various working media, for example, uranium hexafluoride, spontaneously react with this adhesive, the risk of leakage is high. In many applications, this mounting technique therefore cannot be employed.

SUMMARY OF THE INVENTION

The object of the present invention is to provide a method for making a metal seal for flanged joints, and a metal seal made by that method, which permit the advantages of tightness and moderate cost offered by wire seals made preferably of aluminum to be retained without being afflicted with the drawbacks which mounting with silicone adhesive entails.

To accomplish this object in making a metal seal for a flanged joint a length of a profiled bar having a cross section generally in the shape of a keyhole and with a thicker portion on one side which forms a sealing bead, and a thinner portion of elongated cross section on the other side which stiffens the bar and serves to mount the seal on one of the two flanges of the joint adhesively without adhesive on the thicker, sealing bead portion. Sections of its thinner portion may be removed over a region to be curved, depending on the radius of curvature. The length of profiled bar is then bent to produce the desired form of the seal and the free ends of the bar then united by welding or soldering, for example. The thinner portions are preferably also removed from the ends of the length of profiled bar before they are united.

In a seal so produced, the sealing bead serves the purpose of the prior-art wire, with all its advantages. Its "lugs", preferably directed outwardly, make it possible to secure the seal in place with a silicone adhesive without wetting the sealing bead itself. The method of the invention still permits seals of any desired form and diameter to be produced, which can be done by removing the thinner portion of the length of profiled bar at least in part. Also, because of the lugs which remain, the seal ring has greater stiffness and therefore is easier to handle.

DESCRIPTION OF THE DRAWINGS

Advantages and details of the invention will now be described with reference to preferred embodiments illustrated in FIGs. 1 to 5, in which.

DETAILED DESCRIPTION OF THE PREFERRED EMBODIMENTS

Figure 1:
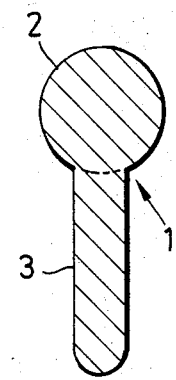
FIG. 1 is a cross section of the seal member.

Shown in FIG. 1 is the cross section of a profiled bar 1 on which the production of the seal in accordance with the invention is based. Its thicker portion 2 forms the sealing bead and has a diameter of a few millimeters, for example. Its thinner portion 3 is removed in the regions to be curved before the seal is bent so that only the sealing bead 2 remains.

The profiled bar is then bent, and preferably so that the lugs which remain are directed outwardly. Its free ends are united, preferably by welding. Any enlarged weld area is finished after welding.

Figure 2:
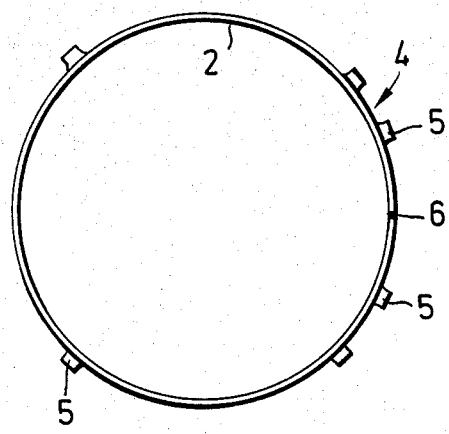
FIGS. 2 to 5 are plan views of various seal members.

FIG. 2 shows a circular seal 4 produced by this method. It only has few and short lugs 5 so that the uniformity of the circular form is not impaired thereby. The welded joint is designated 6.

Figure 3:
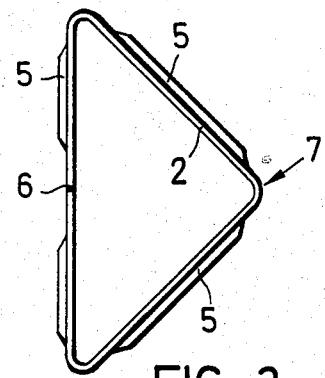
Figure 5:
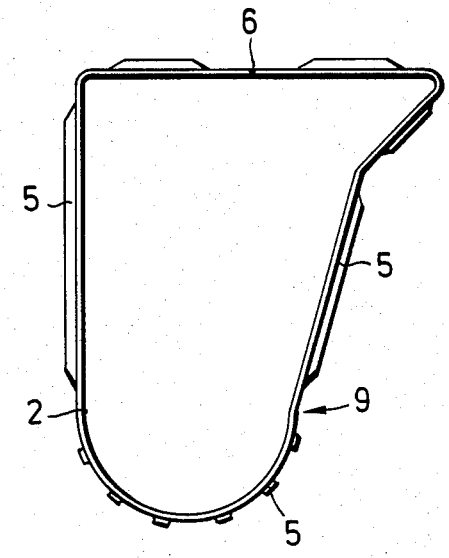
Figure 4:
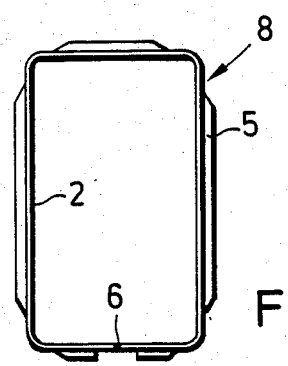

Shown in FIGS. 3, 4 and 5 are seals which deviate from circularity. Here, too, the sealing bead is designated 2. The lugs 5 which remain are very long, especially over straight sections of the seal, and therefore have a stiffening effect. The welded joints are designated 6. There are no lugs in the vicinity of these joints, either, so that these regions can readily be held in clamping jaws for the purpose of welding the free ends together. In the case of very complex seal forms, there may be two welded joints.

It will be appreciated that the instant specification and claims are set forth by way of illustration and not of limitation, and that various changes and modifications may be without departing from the spirit and scope of the present invention.

What is claimed is:

1. A method of making a closed-figure metal seal for a flanged joint, comprising:
   bending a length of metal bar along its length into a closed figure corresponding to the figure of the flanged joint, the metal bar having a cross section profiled generally in the shape of a keyhole with a thicker portion on one side for forming a sealing bead in the flanged joint in use and a thinner portion of elongated cross section on the other side for stiffening the metal bar;
   uniting ends of the metal bar to close the figure of the metal seal;
   mounting the metal bar on one of the flanges of the flanged joint with adhesive on the thinner portion of the metal bar and without adhesive on the thicker portion of the metal bar, whereby leaks form later dissolving thereof are avoided; and sealingly compressing the thicker portion of the metal bar in the flanged joint as the sealing bead.

2. The method of claim 1, and further comprising: removing portions of the thinner, elongated cross section portion of the profiled metal bar adjacent the ends thereof before uniting the ends.

3. A metal seal member made by the method of claim 1.

* * * * *